United States Patent [19]

Aratani

[11] Patent Number: 4,846,868

[45] Date of Patent: Jul. 11, 1989

[54] CHEMICALLY STRENGTHENED GLASS ARTICLE AND METHOD OF PRODUCING SAME

[75] Inventor: Shin-ichi Aratani, Mie, Japan

[73] Assignee: Central Glass Company, Limited, Ube, Japan

[21] Appl. No.: 92,664

[22] Filed: Sep. 3, 1987

[30] Foreign Application Priority Data

Sep. 5, 1986 [JP] Japan ................. 61-208050

[51] Int. Cl.⁴ ............................................ C03C 21/00
[52] U.S. Cl. ..................................... 65/30.14; 65/116
[58] Field of Search ...................... 65/30.14, 30.13, 116

[56] References Cited

U.S. PATENT DOCUMENTS

| | | | |
|---|---|---|---|
| 3,410,673 | 11/1968 | Marusak | 65/30.14 |
| 3,433,611 | 3/1969 | Saunders | 65/30.14 |
| 3,798,013 | 3/1974 | Inoue et al. | 65/30.14 |
| 3,844,754 | 10/1974 | Grubb | 65/30.14 |
| 4,671,814 | 6/1987 | Aratani et al. | 65/30.14 |

FOREIGN PATENT DOCUMENTS 1018890 2/1966 United Kingdom .

*Primary Examiner*—Kenneth M. Schor
*Attorney, Agent, or Firm*—Fleit, Jacobson, Cohn, Price, Holman & Stern

[57] ABSTRACT

A glass article made of a glass, in which the content of a principal alkali metal ion is distinctly higher than the content of any other alkali metal ion optionally contained in the glass, is highly strengthened by first treating the glass article with a source of the principal alkali metal ion to increase only the content of the principal alkali metal ion in each surface layer of the glass article and then at least partially exchanging the principal alkali metal ion in each surface layer of the glass article with another alkali metal ion larger in ionic radius. In the strengthened glass article the total content of alkali metal ions in each surface layer becomes higher than that in the inner region.

6 Claims, No Drawings

CHEMICALLY STRENGTHENED GLASS ARTICLE AND METHOD OF PRODUCING SAME

BACKGROUND OF THE INVENTION

This invention relates to a glass article which is made of an ordinary oxide glass represented by soda-lime-silicate glass and is afforded with high mechnaical strength by an ion exchange treatment of its surfaces and to a method of producing the same.

A well known method of increasing mechanical strength of a glass article by a chemical treatment is the so-called low-temperature type ion exchange method. This method comprises contacting the glass article with a source of an alkali metal ion relatively large in ionic radius, such as potassium ion, to cause at least partial exchange of a relatively small alkali metal ion, such as sodium ion, in the surface layers of the glass article with the larger alkali metal ion. The ion exchanging treatment induces compressive stresses in the surface layers of the glass article. At present the low-temperature type ion exchange method is prevailing for strengthing relatively thin glass sheets and relative small-sized or intricately shaped glass articles.

In principle, by the ion exhcange method it is possible to induce greater compressive stresses in the glass surfaces than by the thermal tempering method. In practice, however, the ion exchange method tends to entail relatively high costs. Basically the ion exchanging treatment requires a considerably long time, and the efficiency of the treatment and the degree of strengthing depend greatly on the composition of the glass. Therefore, it is often to use a specially formulated glass composition containing a considerably increased amount of $Na_2O$ or $Li_2O$ or containing relatively large amounts of auxiliary components such as, for example, $Al_2O_3$ and/or $ZrO_2$. Such modification of the glass composition leads to an increase in material cost and, besides, is liable to unfavorably affect some properties of the glass as represented by a decrease in the weather resistance of the obtained glass or an increase in the tendency toward devitrification during the glass manufacturing process.

U.S. Pat. No. 3,798,013 shows a method of strengthening a glass article by two-stage ion exchange treatment of the low-temperature type. In the first-stage treatment of a glass containing sodium ion as the principal alkali metal ion, a mixture of a sodium salt and a potassium salt is used as the external source of alkali metal ions. In the second-stage treatment a potassium salt alone is used as the external source of alkali metal ion, and the treating temperature is lower than in the first-stage treatment and/or the treatment time is shorter than in the first-stage treatment. This method is proposed with a view to shortening the total time of ion exchange treatment for accomplishment of sufficient strengthening of the glass article. However, the mechanical strength of the obtained glass article is not very higher than that of a similar glass article strengthened by the conventional single-stage ion exchange treatment.

SUMMARY OF THE INVENTION

It is an object of the present invention to provide a glass article which may be made of an ordinary and relatively inexpensive glass such as, for example, a soda-lime-silicate glass and is highly strengthened by an ion exchange method.

It is another object of the invention to provide a method of chemically strengthening a glass article to obtain a strengthened glass article according to the invention.

The present invention provide a chemically strengthened glass article formed of a glass in which the content of a principal alkali metal ion is distinctly higher than the content of any other alkali metal ion optionally contained in the glass composition and in which the distribution of any other metal ion is substantially uniform, the glass article being strengthened by at least partial exchange of the principal alkali metal ion in each surface layer of the glass article with another alkali metal ion which is larger in ionic radius than the principal alkali metal ion and characterized in that the total content of alkali metal ions in each surface layer of the glass article is higher than that in the inner region of the glass article.

Furthermore, this invention provides a method of chemically strengthening a glass article formed of a glass in which the content of a principal alkali metal ion is distinctly higher than the content of any othr alkali metal ion optionally contained in the glass and in which the distribution of any other metal ion is substantially uniform, the method comprising the steps of (a) additionally introducing said principal alkali metal ion into each surface layer of the glass article from an external source of said principal alkali metal ion to thereby render the content of said principal alkali metal ion in each surface layer of the glass article higher than that in the inner region of the glass article, said external source being substantially free of any alkali metal ion other than said principal alkali metal ion, and (b) after step (a) strengthening the glass article by at least partial exchange of said principal alkali metal ion in each surface layer of is glass article with another alkali metal ion which is larger in ionic radius than said principal alkali metal ion.

The primary feature of the invention resides in that only the content of the principal alkali metal ion in the glass is increased in each surface layer of the glass article by a treatment which is made subsequent to forming of the glass article and precedent to the ion exchange treatment of the low-temperature type. The increase in the content of the principal alkali metal ion in the surface layers of the glass article has the effect of augmenting the ion exchange at the subsequent treatment. Consequently, greater compressive stresses can be induced in the surfaces of the glass article. In general, the break strength of glass articles strengthened by this method becomes 5 to 7 times that of the unstrengthened glass articles. This is comparable to the degree of strengthening attained by a conventional ion exchange treatment of a glass having a specially formulated composition. In contrast, when the pretreatment according to the invention is omitted the break strength of the simply ion-exchanged glass articles rarely reaches 5 times that of the unstrengthened glass arcticles.

According to the invention, such a high degree of strengthening is accomplished by not necessarily modifying the basic composition of the glass. For example, an ordinary soda-lime-silicate glass can be highly strengthened by the method according to the invention. In as much as an ordinary glass composition is used the present invention does not bring about a substantial increase in the material cost, and there is no need of changing the operation conditions and apparatus for melting and forming the glass, and there is no possibility of suffering from devitrification or any other problem during the glass manufacturing process or degradation of the obtained glass. However, it is also possible to apply the present invention to a special glass composition suited to the conventional ion exchange method to thereby obtain glass articles having still higher strength.

This invention is particularly suitable for application to glass sheets thinner than about 3 mm or glass articles formed of such sheets, though this is not limitative of the invention. Strenghtened glass articles according to the invention include, for example, substrates of electronic devices, photomask substrates, optical disc substrates, transparent parts of display devices, window glasses for buildings and vehicles, cooking glassware, parts of business machines and glass parts of furniture.

DESCRIPTION OF THE PREFERRED EMBODIMENTS

This invention is applicable to various types of glasses including soda-lime-silicate glass, boro-silicate glass and alumino-silicate glass. In most cases the glass article according to the invention is in the form of a flat or curved sheet or plate, but this is not limitative. The glass article may be formed by any of the conventional glass forming methods such as drawing method, roll-out method, pressing method or molding or casting method. However, this invention is not applied to glass sheets produced by the float process since such glass sheets contain tin ion in only one of the opposite two surface layeres and, hence, are not uniform in the distribution of metal ions other than alkali metal ions.

In a practical sense, the principal alkali metal ion in a glass used in this invention is either sodium ion or lithium ion. It is permissible that the glass contains at least one different alkali metal ion, but it is necessary that the content of the principal alkali metal ion is distinctly higher than the total content of the other alakli metal ion(s). If, for example, the glass contains nearly equal amounts of sodium ion and potassium ion the pretreatment according to the invention has little effect on the degree of strengthening by the subsequent ion exchanging treatment. It is preferred that the total content of the other alkali metal ion(s) is not more than 50% of the principal alkali metal ion on a molar basis.

The pretreatment to increase the content of the principal alkali metal ion of the glass in each surface layer of the glass article is made by contacting the glass article with a salt of the same alkali metal at an elevated temperature. When the principal alkali metal ion is sodium ion the alkali metal salt is usually selected from sodium nitrate, sodium sulfate and sodium phosphate, and when the prinipal alkali metal ion is lithium ion usually a selection is made from lithium nitrate, lithium sulfate and lithium phosphate. A mixture of two or three kinds of sodium salts or lithium salts can be used. In every case it is important that the external source of the principal alakli metal ion does not contain any other kind of alkali metal ion. If, for example, a mixture of a sodum salt and a potassium salt is used the object of the pretreatment according to the invention can hardly be accomplished. Usually the pretreatment is performed by immersing the glass article in a bath of a molten salt of sodium or lithium, though it is also possible to employ a different contacting method such as application of a molten salt or a paste of a selected salt to the surfaces of the glass article.

It is suitable to perform the pretreatment at a temperature in the range from about 350° C. to about 650° C., and a suitable range of the treatment time is from 0.1 to 100 hr.

After making the above described pretreatment, the glass article is strengthened by a known ion exchange treatment of the low-temperature type. That is, the glass article is contacted with an external source of an alkali metal ion larger in ionic radius than the principal alkali metal ion in the glass at an elevated temperature which is lower than the transition temperature of the glass. As the external source of a large alkali metal ion, it is usual to use potassium nitrate when the principal alkali metal ion is sodium ion and sodium nitrate and/or potassium nitrate when the principal alkali metal ion is lithium ion.

The invention is further illustrated by the following nonlimitative examples.

EXAMPLE 1

A soda-lime-silicate glass was formed into an about 3 mm thick sheet by a roll-out method. The glass had the following composition, expressed as oxides on a weight basis and ignoring impurities: 73.2% $SiO_2$, 13.0% $Na_2O$, 1.1% $K_2O$, 6.8% CaO, 3.7% MgO, 1.8% $Al_2O_3$ and 0.1% $Fe_2O_3$. The glass sheet was cut into about 150 mm square specimens, which were divided into two groups.

The glass specimens of the first group were immersed in a bath of molten sodium nitrate maintained at about 550° C. for about 6 hr to thereby increase the concentration of sodium ions in the both surface layers of the glass sheet. The specimens taken up from the bath were left to cool down and were washed with water to remove adherent sodium nitrate and dried. After this pretreatment, the specimens were immersed in a bath of molten potassium nitrate kept at about 470° C. for about 6 hr to accomplish partial exchange of sodium ions in the surface layers of the glass sheet with potassium ions. After this strengthening treatment the specimens were left to cool down, washed and dried.

The glass specimens strengthened by the above process were subjected to measurement of compressive stress at the surfaces with a surface stress tester supplied from Toshiba Glass Co. The measurements ranged from 70 to 85 $kg/mm^2$. The strength of the glass specimens was measured by an annular-load bending test method (the support range was 80 mm in inner diameter, the load transmitting ring was 40 mm in outer diameter, the rate of exerting load was 2 mm/min). The break strength measured by this method ranged from 60 to 80 $kg/mm^2$.

The glass specimens of the second group were subjected to the above described strengthening treatment with molten potassium nitrate without any pretreatment. In this case the compressive stress values of at the surfaces of the strengthened glass specimens were 55–65 $kg/mm^2$, and the break strength measured by the aforementioned method ranged from 45 to 60 $kg/mm^2$. That is, the pretreatment with molten sodium nitrate had the effect of enhancing the degree of strengthening by about 30%.

EXAMPLE 2

A soda-lime-silicate glass was formed into an about 4 mm thick plate by a casting method. The glass had the following composition, expressed as oxides on a weight basis and ignoring impurities: 72.5% $SiO_2$, 13.8% $Na_2O$, 0.1% $K_2O$, 8.8% CaO, 4.1% MgO, 0.2% $Al_2O_3$ and 0.1% $Fe_2O_3$. A sufficiently flat region of the glass plate was cut into about 35 mm square specimens, which were divided into two groups.

The glass specimens of the first group were immersed in a bath of sodium nitrate, which contained 1 wt % of sodium phosphate and was maintained at about 480° C., for about 16 hr. The specimens were taken up from the bath and, after cooling, washed with water and dried. Next, the specimens were immersed in a bath of molten potassium nitrate maintained at about 450° C. for about 16 hr to thereby accomplish strengthening by ion exchange. The specimens taken up from the bath were washed and dried.

The break strength of the thus strenghtened glass specimens was measured by the annular-load bending test method (the support ring was 25 mm in inner diameter, the load transmitting ring was 5 mm in outer diameter, the rate of exerting load was 5 mm/min). The measurements ranged from 60 to 85 kg/mm$^2$.

The glass specimens of the second group were subjected to the strengthening treatment with molten potassium nitrate under the same conditions without any pretreatment. In this case the break strength of the strengthened glass specimens, measured by the same method, range from 50 to 65 kg/mm$^2$.

EXAMPLE 3

A glass of the following composition, expressed as oxides on a width basis and ignoring impurites, was melted in a crucible: 52.2% $SiO_2$, 14.0% $Li_2O$, 0.1% $Na_2O$, 0.1% $K_2O$, 5.1% CaO, 3.8% MgO, 12.7% $Al_2O_3$ and 0.1% $Fe_2O_3$. The molten glass was cast into an about 2.5 mm thick plate. A sufficiently flat region of the glass plate was cut into about 30 mm square specimens, which were divided into two groups.

The glass specimens of the first group were immersed in a bath of molten lithium nitrate, which contained 5 wt % of lithium phosphate and was maintained at about 500° C., for about 20 hr. Subsequent to this pretreatment the specimens were immersed in a bath of molten sodium nitrate maintained at about 450° C. for about 20 hr to thereby accomplish strengthening by ion exchange.

The break strength of the thus strengthened glass specimens was measured by the annular-load bending test method (the support ring was 20 mm in inner diameter, the load transmitting ring was 5 mm in outer diameter, the rate of exerting load was 5 mm/min). The measurements ranged from 35 to 55 kg/mm$^2$.

The glass specimens of the second group were subjected to the strengthening treatment with molten sodium nitrate under the same conditions without any pretreatment. In this case the break strength of the strengthened glass specimens, measured by the same method, ranged from 30 to 40 kg/mm$^2$.

COMPARATIVE EXAMPLE

A glass of the following composition, expressed as oxides on a weight basis and ignoring impurities was formed into an about 4 mm thick plate by the same method as in Example 3: 73.5% $SiO_2$, 6.8% $Na_2O$, 6.8% $K_2O$, 05.% $Li_2O$, 6.85% CaO, 3.78% MgO, 1.7% $Al_2O_3$ and 0.1% $Fe_2O_3$. A sufficiently flat region of the glass plate was cut into about 35 mm square specimens, which were divided into two groups.

The glass specimens of the first group were immersed in a bath of molten sodium nitrate maintained at about 500° C. for about 16 hr. Subsequent to this pretreatment the specimens were immersed in a bath of molten potassium nitrate maintained at about 450° C. for about 16 hr to thereby accomplish strengthening by ion exchange.

The break strength of the glass specimens strengthened by the above process was measured by the same method as in Example 3. The measurements ranged from 20 to 40 kg/mm$^2$.

The glass specimens of the second group were subjected to the above described ion exchanging treatment without making any pretreatment. The thus strengthened glass specimens exhibited nearly the same break strength as the strengthened specimens of the first group.

What is claimed is:

1. A method of chemically strengthening a glass article formed of a silicate glass in which the content of a principal alkali metal ion is distinctly higher than the content of any other alkali metal ion contained in the glass and in which the distribution of any other metal ion is uniform, the total content of said any other alkali metal ion in said glass being not more than 6 mol% of the content of said principal alkali metal ion in said glass, the method comprising the steps of:

(a) introducing said principal alkali metal ion into each surface layer of the glass article by contacting the surfaces of the glass article with an external source of said principal alkali metal ion at a temperature lower than the strain point of the glass to thereby render the content of said principal alkali metal ion in each surface layer of the glass article higher than that in the inner region of the glass article, said external source being selected from the group consisting of a metal of a salt of said principal alkali metal ion and a paste of a salt of said principal alkali metal ion and being substantially free of any alkali metal ion other than said principal alkali metal ion; and (b) after step (a), strengthening the glass article by at least partial exchange of said principal alkali metal ion in each surface layer of the glass article with another alkali metal ion which is larger in ionic radius than said principal alkali metal ion by contacting the surfaces of the glass article with a source of said another alkali metal ion at a temperature lower than the strain point of the glass, said source being selected from the group consisting of a metal of a salt of said another alkali metal ion and a paste of a salt of said another alkali metal ion.

2. A method according to claim 1, wherein said salt of said principal alakli metal ion is selected from the group consisting of nitrate, sulfate and phosphate.

3. A method according to claim 1, wherein said temperature at step (a) is in the range from about 350° C. to about 650° C.

4. A method according to claim 1, wherein said principal alkali metal ion is sodium ion, said another alkali metal ion being potassium ion.

5. A method according to claim 1, wherein said principal alkali metal ion is lithium ion, said another alkali metal ion being seleted from sodium ion and potassium ion.

6. A method according to claim 1, wherein said glass article is in the form of a glass sheet.

* * * * *